Patented June 27, 1950

2,513,018

UNITED STATES PATENT OFFICE 2,513,018

NITRODITHIOACETATES AS FUNGICIDES

Everett E. Gilbert, New York, N. Y., assignor to Allied Chemical & Dye Corporation, a corporation of New York No Drawing. Application October 26, 1946, Serial No. 706,049

4 Claims. (Cl. 167—22)

This invention relates to compositions for preventing or arresting infestations of fungi, i. e., to fungicides.

According to the present invention, it has been discovered that metal salts of nitrodithioacetic acid, nitromethyldithioacetic acid, nitrodimethyldithioacetic acid and nitroethyldithioacetic acid, and mixtures of such salts are effective to control fungi, particularly fungi infesting vegetation. Thus this invention involves the use as fungicides of a metal salt of a compound having the following formula:

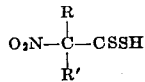

in which R is hydrogen or a methyl group and R' is hydrogen, or a methyl or ethyl group, the total number of carbon atoms in said compound not exceeding 4. For example, these metal salts or mixtures thereof may be used to control Brown Rot of stone fruits (Sclerotinia fructicola), Early Blight of potato (Alternaria solani), Early Blight and Late Blight on tomato plants (Phytopthora infestans), Apple Scab (Venturia inaequalis) and other fungi. Among the salts which may be used in accordance with this invention are the alkali, alkaline earth, copper, zinc, iron and mercury salts of the nitrodithioacetic acids, the copper, zinc, iron and mercury salts being preferred.

The fungicides of this invention may be prepared by mixing nitromethane with carbon disulfide in an organic medium such as ethanol or isopropanol or, preferably, methanol, and adding aqueous potassium hydroxide slowly with stirring to produce an aqueous solution of potassium nitrodithioacetate, which may be recovered, and, if desired, converted to the salt of another metal. Desirably the reaction above described is carried out at room temperature (about 25° C.) and atmospheric pressure, although optimum yields are obtained if the reaction mixture is cooled during the addition of the potassium hydroxide and the temperature maintained between 10° and 20° C. The potassium salt may be produced in dry form by crystallization or by completely evaporating the water and methanol, or a concentrated solution thereof may be produced for use as a fungicide. By substituting nitroethane or a nitropropane (1-nitropropane or 2-nitropropane) for the nitromethane, corresponding substituted nitrodithioacetates may be produced, i. e., nitromethyldithioacetate will result if nitroethane is used, nitroethyldithioacetate if 1-nitropropane is employed, and nitrodimethyldithioacetate if 2-nitropropane is employed.

Other metal salts of the nitrodithioacetic acids described may be produced by reacting one of the potassium salts with a water soluble salt of the metal in question; for example, to produce the copper, zinc or mercury nitrodithioacetate, potassium nitrodithioacetate may be reacted with copper or zinc sulfate or mercuric chloride, respectively, in an aqueous medium to precipitate the copper, zinc or mercury nitrodithioacetate; to produce nitrodithioacetates of the alkaline earth metals, potassium nitrodithioacetate may be reacted with calcium, strontium or barium chloride in an aqueous medium to precipitate the desired nitrodithioacetate. In like manner the potassium salt of the substituted nitrodithioacetates may be reacted with water soluble salts of the metals in question to produce the desired metal salts of the substituted nitrodithioacetates.

Instead of reacting the water soluble salt of a metal other than potassium with potassium nitrodithioacetate or the potassium salt of a substituted nitrodithioacetic acid, such metal salts of nitrodithioacetic acid or substituted nitrodithioacetic acids may be produced by mixing nitromethane, nitroethane, or a nitropropane with carbon disulfide in a methanol medium, adding aqueous potassium hydroxide to the reaction mixture, and then adding a water soluble salt of the metal in question, for example, zinc sulfate, zinc acetate, copper sulfate, calcium chloride, ferric chloride or mercuric chloride, while stirring, to precipitate the desired metal salt of the nitrodithioacetic acid or substituted nitrodithioacetic acid, as described in copending application Serial No. 706,048, filed as of even date herewith, Pat. No. 2,495,322. The reaction is desirably carried out at room temperature (about 25° C.) and atmospheric pressure.

The amounts of reactants used in the above outlined processes are not critical, provided enough of each of the reactants is employed to insure complete reaction thereof with the other reactants so as to produce the desired products.

It has been found that the salts as produced, which may contain small amounts of impurities, are effective fungicides; they need not be treated to obtain them in substantially pure form before use.

The fungicides of this invention may be used in combination with carriers, which may be either toxic or non-toxic to fungi and insect life. Thus they may be used along with the usual spray amendments such as casein, milk powder, emulsifying or emulsified oils, fish oil soap, wetting or dispersing agents, and in combination with dust carriers such as diatomaceous earth, talc, clay and the like. The fungicides may be applied in dry form as dusts, in the form of solutions in suitable solvents, or as dispersions. For example, the alkali salts, which are water soluble, may be applied in water solution. The fungicides may be added to known insecticidal materials such, for example, as lead arsenate, xanthone, DDT (dichloro diphenyl trichloroethane) and the resultant mixture applied to obtain control of both fungi and insect pests. In general the concentration of fungicidal salt when employed as toxicant in spray form is preferably within the range of ¼ to 1% by weight of the composition applied to the plant or other fungi infested host, the remainder of the composition consisting primarily of water. When employed in dust form, the fungicidal salt content should preferably be 10% to 20% by weight of the dust.

The data on the following series of tests illustrate the efficiency of representative compositions falling within the scope of the invention; it will be understood the invention is not limited to the use of these compositions for control of the fungi mentioned but includes the control of other fungi by these and other metal salts of nitrodithioacetic acid and of the substituted nitrodithioacetic acids enumerated above. The tests described were conducted using aqueous dispersions of the salts listed to establish the concentration in parts per million of the composition tested required to kill 50% of the fungus spores utilized (which spores are representative economic plant fungi), and were carried out as described in "Phytopathology," volume 33, pages 627–632 (1943). The results of these tests were as follows:

Series A

| Fungus under Test | Metal Salt Tested | Parts per Million of Salt to Give 50% Kill |
|---|---|---|
| Venturia inaequalis (Apple Scab). | zinc nitrodithioacetate | 10 |
| Do | iron nitrodithioacetate | 20 |
| Sclerotinia fructicola (Brown Rot). | copper nitrodithioacetate | 1 |
| Do | zinc nitrodithioacetate | 32 |
| Do | iron nitrodithioacetate | 2 |
| Do | potassium nitrodithioacetate. | 170 |
| Do | mixture of copper, zinc and iron nitrodithioacetates in equal parts. | 300 |
| Alternaria solani (Early Blight). | copper nitrodithioacetate | 10 |
| Do | zinc nitrodithioacetate | 26 |
| Do | iron nitrodithioacetate | 10 |
| Do | mixture of copper, zinc and iron nitrodithioacetates in equal parts. | 105 |
| Do | potassium nitrodithioacetate. | 200 |

In this type of test it is generally recognized that a compound of which less than 1000 parts per million are effective to give 50% kill has fungicidal value. Since the fungicides of this invention gave results far below this value, the test data demonstrate the effectiveness of the compounds above noted as fungicides.

The procedure followed in a second series (Series B) of tests utilized the standard greenhouse technique described in volume 13 of Contrib. Boyce Thompson Institute pages 93–134 (1943) the percentage, by weight of the composition under test, of salt required to give 95% kill being determined; tomato plants were used as the test plant and these plants were infested with Phytopthora infestans and with Alternaria solani.

Series B

| Fungus under Test | Metal Salt Tested | Percent by Weight of Salt to Give 95% Kill |
|---|---|---|
| Alternaria solani (Early Blight). | iron nitrodithioacetate | .9 |
| Do | zinc nitrodithioacetate | .2 |
| Do | copper nitrodithioacetate | .4 |
| Do | potassium nitrodithioacetate. | .6 |
| Do | mixture of iron, zinc and copper nitrodithioacetates in equal parts. | .4 |
| Phytopthora infestans (Late Blight). | copper nitrodithioacetate | .03 |
| Do | potassium nitrodithioacetate. | .08 |

A like test employing Bordeaux mixture, which is commonly used in controlling Alternaria solani, required a concentration of 5.5% by weight to effect 95% kill of Alternaria solani. Comparison of this value with the values above given for the metal salts of this invention demonstrates the superiority of these salts for controlling this fungus.

It is intended that all matter contained in the above description shall be interpreted as illustrative and not in a limiting sense.

What is claimed is:

1. A fungicidal composition comprising a carrier having associated therewith a heavy metal salt of a compound having the formula

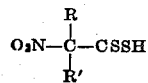

wherein R is a member of the group consisting of hydrogen and the methyl group and R' is a member of the group consisting of hydrogen, the methyl and ethyl groups, said compound containing not over four carbon atoms.

2. A fungicidal composition comprising a carrier and as an active toxicant copper nitrodithioacetate.

3. A fungicidal composition comprising a carrier and as an active toxicant zinc nitrodithioacetate.

4. A fungicidal composition comprising a carrier and as an active toxicant iron nitrodithioacetate.

EVERETT E. GILBERT.

REFERENCES CITED

The following references are of record in the file of this patent:

UNITED STATES PATENTS

| Number | Name | Date |
|---|---|---|
| Re. 22,750 | Tisdale | Apr. 30, 1946 |
| 1,620,490 | Sanders | Mar. 8, 1927 |
| 1,762,709 | Alvord | June 10, 1930 |
| 2,337,466 | Herbert | Dec. 21, 1943 |

FOREIGN PATENTS

| Number | Country | Date |
|---|---|---|
| 376,255 | Canada | Sept. 6, 1938 |

OTHER REFERENCES

Freund, Deutsche Chemische Gesellschaft, Berichte, 52B (1919), pages 552–554. Abstract in Chemical Abstracts, vol. 13, 1919, page 2526.